United States Patent
Kim et al.

(10) Patent No.: US 10,244,119 B2
(45) Date of Patent: Mar. 26, 2019

(54) DRIVER'S COMMUNICATION ASSISTANCE INFRA SYSTEM AND METHOD FOR ABIDING BY DRIVER'S MOBILE PHONE REGULATIONS USING THE SAME

(71) Applicants: Hyundai Motor Company, Seoul (KR); Kia Motors Corporation, Seoul (KR)

(72) Inventors: Sung-Ho Kim, Seoul (KR); Jun-Tae Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/855,857

(22) Filed: Dec. 27, 2017

(65) Prior Publication Data

US 2019/0037078 A1    Jan. 31, 2019

(30) Foreign Application Priority Data

Jul. 25, 2017 (KR) .................. 10-2017-0094127

(51) Int. Cl.
| | |
|---|---|
| H04M 3/42 | (2006.01) |
| H04M 3/54 | (2006.01) |
| H04W 8/24 | (2009.01) |
| H04W 4/16 | (2009.01) |
| H04W 76/10 | (2018.01) |

(52) U.S. Cl.
CPC .............. *H04M 3/54* (2013.01); *H04W 4/16* (2013.01); *H04W 8/24* (2013.01); *H04W 76/10* (2018.02)

(58) Field of Classification Search
CPC ......... H04M 3/54; H04W 76/10; H04W 4/16; H04W 76/02; H04W 8/24
USPC .......................................... 455/417; 370/338
See application file for complete search history.

(56) References Cited

U.S. PATENT DOCUMENTS

| | | | | |
|---|---|---|---|---|
| 2011/0105097 | A1* | 5/2011 | Tadayon | ................. H04W 4/50 455/418 |
| 2016/0366711 | A1* | 12/2016 | Shanbhag | ............. H04L 69/165 |
| 2018/0237024 | A1* | 8/2018 | Mummidi | ............. B60W 40/08 |

FOREIGN PATENT DOCUMENTS

| | | |
|---|---|---|
| JP | 2013-210713 A | 10/2013 |
| JP | 2016-199089 A | 12/2016 |
| KR | 10-2015-0080456 A | 7/2015 |
| KR | 10-1546709 B1 | 8/2015 |
| KR | 10-2015-0105621 A | 9/2015 |
| KR | 10-1588190 B1 | 1/2016 |

(Continued)

*Primary Examiner* — Marcos Batista
(74) *Attorney, Agent, or Firm* — Morgan Lewis & Bockius LLP

(57) ABSTRACT

A driver's communication assistance infra system may include a vehicle terminal device mounted in a vehicle and obtaining mobile phone information related to portable communication devices of a driver and a passenger in the vehicle using a mobile phone pairing; and a connected vehicle center receiving and storing the mobile phone information transmitted from the vehicle terminal device and connecting a calling number to the passenger via a mobile communication network upon receipt of the calling number transmitted by the caller while the driver is driving; and the use of the portable communication device of the driver while driving is switched by the connected vehicle center, thus abiding by the driver's mobile phone regulations.

19 Claims, 6 Drawing Sheets

(56) References Cited

FOREIGN PATENT DOCUMENTS

| KR | 10-1599192 B1 | 3/2016 |
|----|---------------|--------|
| WO | WO 2016/197076 A1 | 12/2016 |

* cited by examiner

DRIVER'S COMMUNICATION ASSISTANCE INFRA SYSTEM AND METHOD FOR ABIDING BY DRIVER'S MOBILE PHONE REGULATIONS USING THE SAME

CROSS-REFERENCE(S) TO RELATED APPLICATION(S)

The present application claims priority to Korean Patent Application No. 10-2017-0094127, filed on Jul. 25, 2017, the entire contents of which is incorporated herein for all purposes by this reference.

BACKGROUND OF THE INVENTION

Field of the Invention

The present invention relates to a method for abiding by driver's mobile phone regulations, and more particularly, the present invention relates to a driver's communication assistance infra system and a method for abiding by driver's mobile phone regulations using the same configured for connecting caller's call to a passenger while the driver is driving and restraining the use of the mobile phone (a smartphone) of the driver while driving.

Description of Related Art

Generally, a traffic accident of a vehicle shall endure a social cost, and the social cost due to the traffic accident of the vehicle, such as the social cost of 26 trillion won in 2014 due to traffic accidents in Korea, must be a main issue that should be necessarily resolved in all countries.

Recently, the use of smartphones by a driver while driving at a time when the smartphone is regarded as an essential device causes a traffic accident, and it is confirmed that the rate of use of the smartphone of the driver occupying in the traffic accident is gradually being increased.

Accordingly, various countries tighten legal regulations on the use of the smartphone of the driver while driving to reduce occurrence of a traffic accident of a vehicle due to the mobile phone (smartphone) use.

However, the regulations on the use of the mobile phone (smartphone) while driving enforceability in each country must be a passive method that has a limitation to block the use of the mobile phone (smartphone) while driving because the vehicle is a private product.

As one example, official statistics of the Korea Transportation Safety Authority confirms that a frequency of occurrence of a traffic accident while driving accounts for 50.4% upon a voice call; 40.9% upon the use of social network services (SNS) or short message services (SMS); and 16.5% upon internet searching; and four of ten drivers experienced a traffic an accident caused by the use of a smartphone while driving.

Accordingly, the present invention considering the above problems is directed to providing a driver's communication assistance infra system and a method for abiding by driver's mobile phone regulations using the same may include informing a caller of a vehicle driving status of a driver who owns a mobile phone (smartphone) and restraining an attempt to connect a call; and switching the call to a mobile phone (smartphone) of a passenger and blocking the use of the mobile phone (smartphone) of the driver, thus preemptively preventing the traffic an accident caused by the use of the mobile phone (smartphone) while driving which results in the reduction of the social cost and minimizing the driver's dissatisfaction due to an unidentified call or message due to an message importance classification according to a big data technology based on storing/using history of the mobile phone (smartphone) of the passenger.

The information included in this Background of the Invention section is only for enhancement of understanding of the general background of the invention and may not be taken as an acknowledgment or any form of suggestion that this information forms the prior art already known to a person skilled in the art.

BRIEF SUMMARY

Various aspects of the present invention are directed to providing a river's communication assistance infra system a connected vehicle center communicating with a vehicle via a wireless network and connecting a caller signal, which is transmitted to a driver while driving, to a driver's passenger or occupant.

As an exemplary embodiment of the present invention, the driver's communication assistance infra system may include portable communication devices of the driver and the passenger performing a call connection and a message receipt by caller's transmission; a vehicle terminal device mounted in the vehicle obtains a mobile phone information related to the portable communication device using a mobile phone pairing; and a connected vehicle center receiving and storing the mobile phone information transmitted from the vehicle terminal device and connecting a calling number to the passenger via a wireless network upon receipt of the calling number transmitted by the caller while the driver is driving.

As an exemplary embodiment of the present invention, the mobile phone pairing of the vehicle terminal device performs with respect to the portable communication devices of the driver and the passenger, respectively; the receiving and storing of the mobile phone information related to the connected vehicle center performs with respect to the portable communication devices of the driver and the passenger, respectively.

As an exemplary embodiment of the present invention, the portable communication device may include a phone storing portion storing the mobile phone information and a phone communication portion transmitting the mobile phone information; the vehicle terminal device may include a terminal storing portion storing the mobile phone information and a terminal communication portion receiving and transmitting the mobile phone information to the terminal storing portion, and transmitting to an outside; and the connected vehicle center may include a center server portion performing collection and analysis of the mobile phone information collected through the vehicle terminal device and a center communication portion performing transmission/receipt via the wireless network; and the wireless network is a mobile communication network.

A method for abiding by driver's mobile phone regulations for achieving the above object of the present invention may include recognizing a vehicle driver receiving a caller signal which is received in a connected vehicle center; and controlling an intervention of a connected vehicle which connects the caller signal to the driver's passenger via a wireless network with the vehicle.

As an exemplary embodiment of the present invention, the controlling of the intervention of the connected vehicle may include (A) driver's regulations setting mode obtaining, from the vehicle terminal device, a mobile phone information using a mobile phone pairing with respect to the portable communication devices of the driver and the passenger in the vehicle; and receiving and storing the mobile phone information transmitted from the vehicle terminal device by the connected vehicle center; (B) driver's event detection mode detecting caller's calling signal by the connected vehicle center and confirming the driver's phone number corresponding to the mobile phone information, and dividing into a call request determination connected to the portable communication device of the passenger and a message transmission determination transmitted to the portable communication device of the passenger; and (C) driver's regulations-abiding mode generating and transmitting the call request determination by a call request signal and the message transmission determination by a message request signal, respectively, via the mobile communication network; connecting, upon the call request, the caller's calling number to the portable communication device of the passenger via a mobile communication network, and upon the message transmission request, transmitting the caller's message to the portable communication device of the passenger via the mobile communication network.

As a preferable embodiment, the driver's regulations setting mode may include (a-1) activating the portable communication device; (a-2) receiving the mobile phone information using a mobile phone pairing of the vehicle terminal device and the portable communication device; and (a-3) receiving and storing, in the connected vehicle center, the mobile phone information transmitted from the vehicle terminal device.

As an exemplary embodiment of the present invention, the driver's event detection mode may include (b-1) transmitting the caller's calling signal to the driver; (b-2) receiving the calling signal in the connected vehicle center; and (b-3) confirming the driver's phone number corresponding to the calling signal and identifying the vehicle; (b-4) checking a pre-automatic connection setting of the caller and the driver; (b-5) checking existence of the same schedule of the driver and the caller; (b-6) checking whether to reciprocally store phone numbers between the driver and the caller; (b-7) checking whether to make a call between the driver and the caller before transmitting the calling number; and (b-8) checking whether to make a message dialogue between the driver and the caller before transmitting the calling number.

As an exemplary embodiment of the present invention, the driver's regulations-abiding mode transmits a voice guide and a typical message of "A driver is driving so I will transmit a message to your passenger" to the caller.

The present invention performs the method for abiding by the driver's mobile phone regulations using the driver's communication assistance infra system and thus the following advantages and effects are achieved.

Firstly, it is possible to practically apply a driver's mobile phone (smartphone) regulations while driving which was dependent upon a driver's voluntary will. Secondly, it is possible to preemptively prevent a traffic an accident caused by the use of the mobile phone (smartphone) of the driver while driving, thus reducing a social cost. Thirdly, it is possible to switch to the mobile phone (smartphone) of the passenger according to a message importance and to confirm contents without the driver's direct call. Fourthly, it is possible to inform the caller calling a driver of the driver's driving status, thus reducing an attempt for call connection. Fifthly, it is possible to minimize the driver's dissatisfaction due to an unidentified message by a message importance classification according to a big data technology based on the mobile phones (smartphones) storing/using history of the passenger. Sixthly, it is possible to analyze using a big data and provide a location information related to a vehicle terminal mounted in the driver's vehicle in addition to the mobile phone (smartphone) information related to the driver and the passenger, thus achieving stability and service usage more stably. Seventhly, it is possible to expand the big data technology to a communication infra and service (e.g., SMS, SNS, Facebook, kakao talk and the like), thus expanding to an intelligent and automated service together with various additional services over a preventing function of the traffic accident by abiding by the driver's mobile phone regulations.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
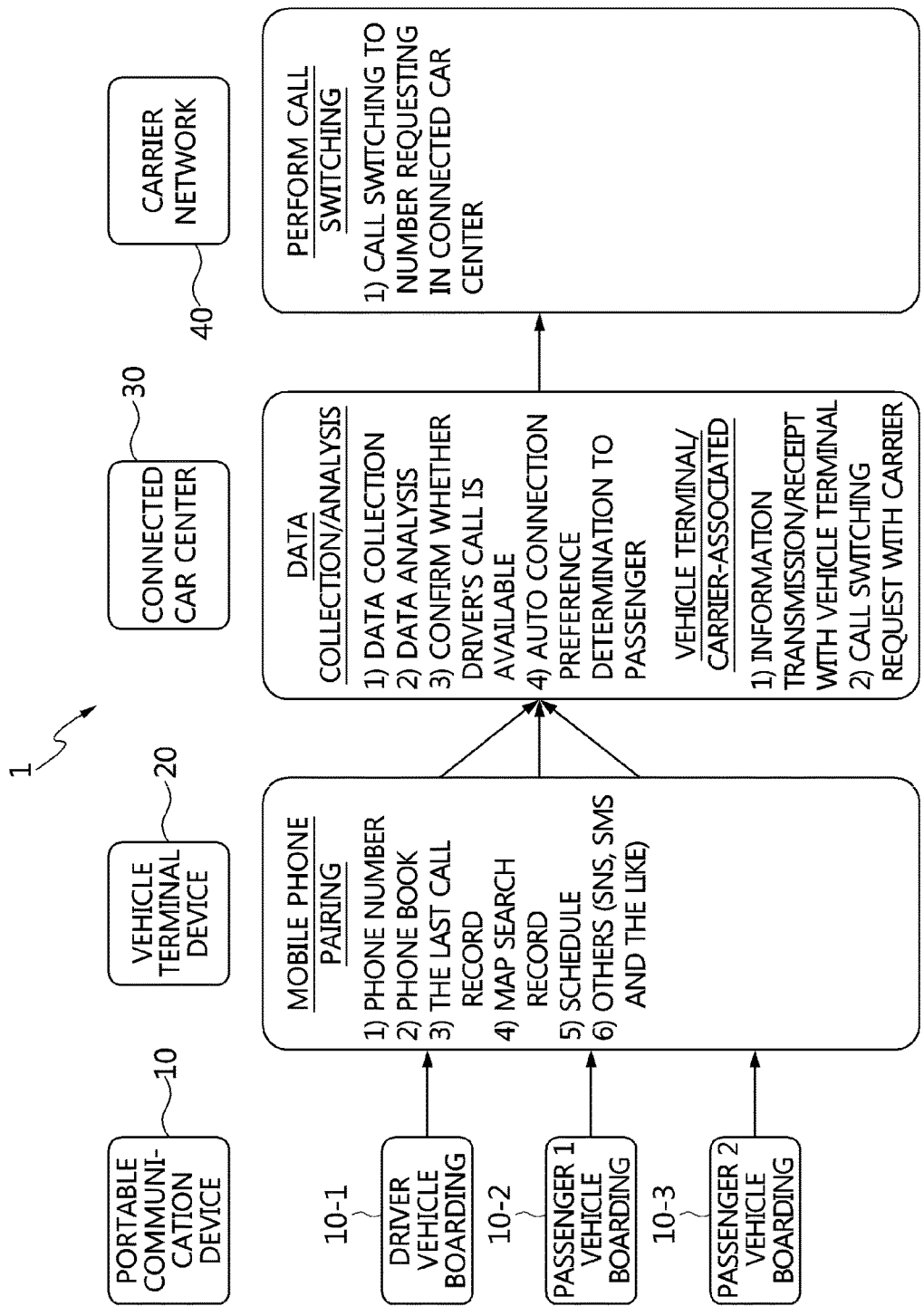
FIG. 1 is a diagram illustrating driver's communication assistance infra system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In various exemplary embodiments, known technologies or detailed descriptions may be reduced or omitted to avoid obscuring appreciation of the present invention by those skilled in the art.

Referring to FIG. 1, driver's communication assistance infra system 1 may include a portable communication device 10, a vehicle terminal device 20, a connected vehicle center 30, and a mobile communication network, or carrier network, 40. The driver's communication assistance infra system 1 is configured to connect a calling signal, which is transmitted to a driver while driving, to a passenger through the connected vehicle center 30 communicating with the vehicle via a wireless network.

The portable communication device 10 represents a mobile phone, that is, a smartphone which performs a carrier service including 2G, 3G, 4G and the like and transmits/receives services of a voice call and a message. Accordingly, the portable communication device 10 may be classified into driver smartphone 10-1 carried by the driver; passenger smartphone 10-2; passenger smartphone 10-3; and passenger smartphone N (N is an integer of 3 or more), which are carried by the passenger.

The vehicle terminal device 20 performs a mobile phone pairing between the portable communication device 10 and the vehicle terminal device 20. As an exemplary embodiment of the present invention, the mobile phone pairing includes a phone number, a phone book, the last call record, a map searching record, a schedule, and other functions (SNS, SMS, and the like), and a basic function that a lamp alternatively blinks from a red light to a blue light and a speaker outputs a notification sound.

The connected vehicle center 30 performs a mobile phone data collection/analysis function through the vehicle terminal device 20 and a vehicle terminal/a carrier-associated function. As an exemplary embodiment of the present invention, the mobile phone data collection/analysis function includes a data collection, a data analysis, a confirmation whether to call the driver, and a determination of an automatic connection preference to a passenger. The vehicle terminal/carrier-associated function includes an information transmission/receipt with the vehicle terminal device 20 and a call switching request with the carrier via the mobile communication network 40. The connected vehicle center 30 operates as a main body which mounts and implements a logic and a program performing the method for abiding by the driver's regulations.

The mobile communication network 40 communicates with the connected vehicle center 30 via a wireless network and performs a call switching with respect to a call or a message and the like transmitted to the driver smartphone 10-1. The mobile communication network 40 directly performs a call switching from the driver smartphone 10-1 to the passenger 1 smartphone 10-2 or the passenger 2 smartphone 10-3 requesting in the connected vehicle center 30. Accordingly, the mobile communication network 40 includes a wireless network provided by a carrier and a national communication network.

Figure 2:
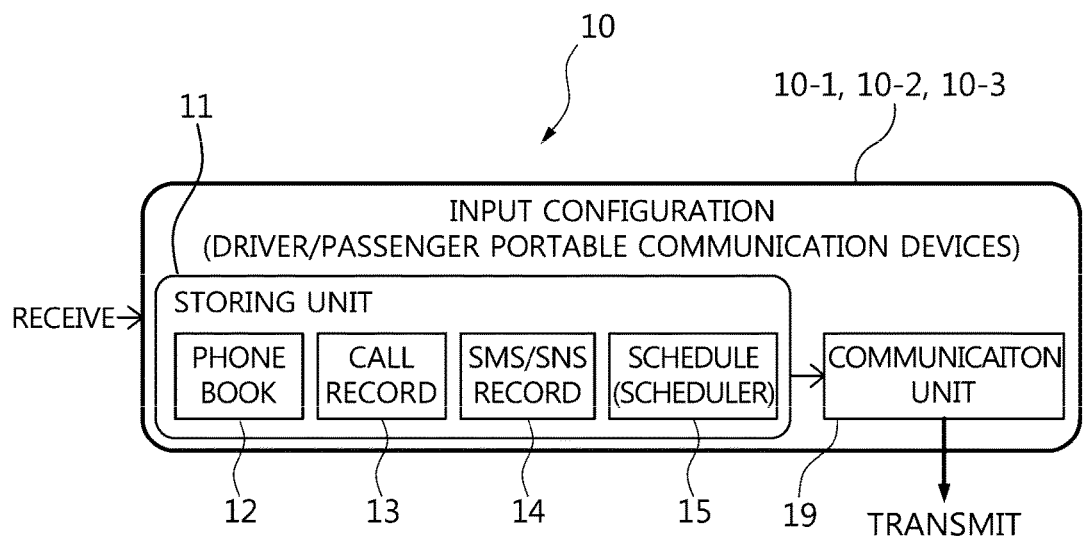
FIG. 2 is a diagram illustrating a portable communication device according to an exemplary embodiment of the present invention.
Figure 3:
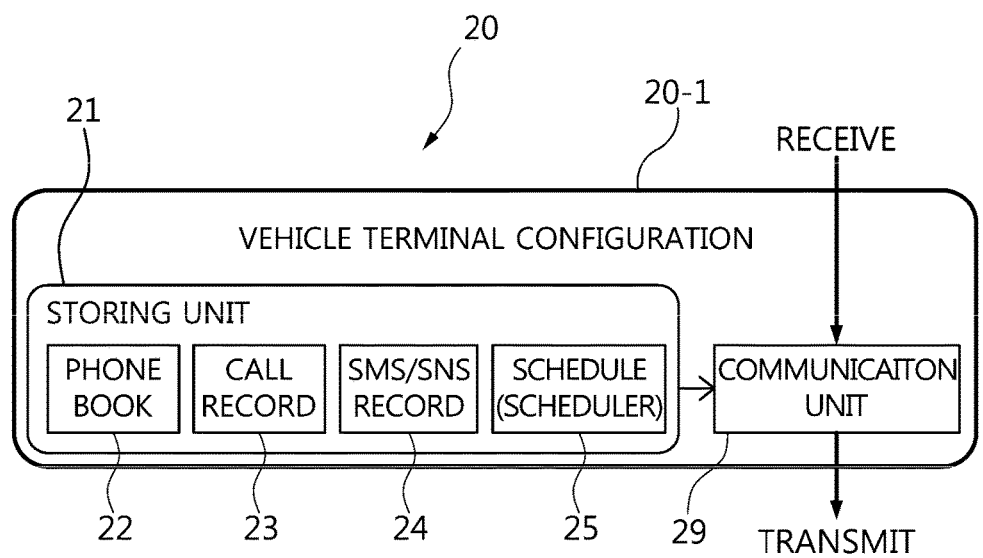
FIG. 3 is a diagram illustrating a vehicle terminal device according to an exemplary embodiment of the present invention.
Figure 4:
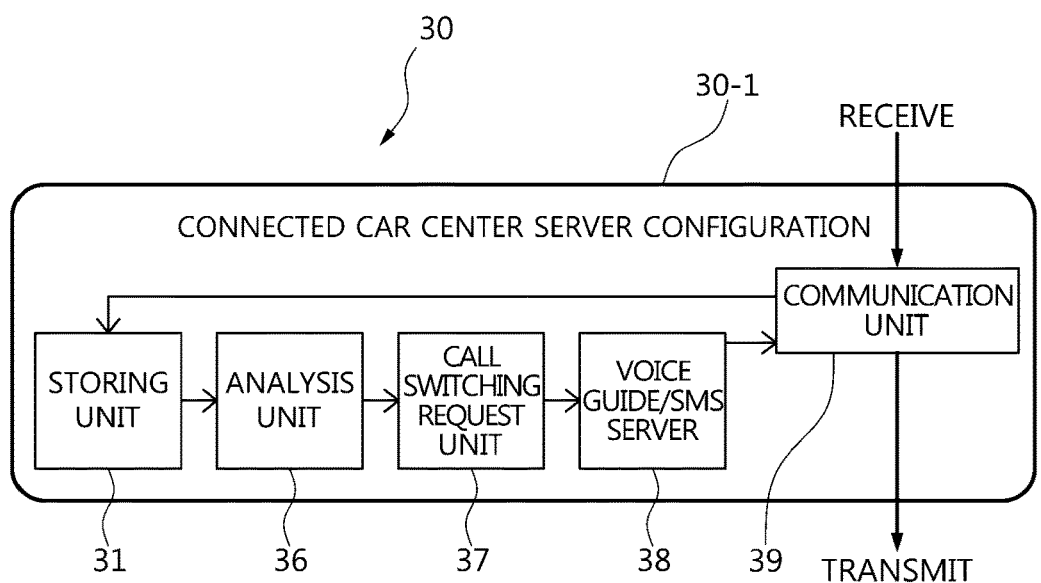
FIG. 4 is a diagram illustrating a connected vehicle center according to an exemplary embodiment of the present invention.

Meanwhile, FIG. 2, FIG. 3, and FIG. 4 are views illustrating essential configurations of the portable communication device 10, the vehicle terminal device 20, and the connected vehicle center 30.

Referring to FIG. 2, the portable communication device 10 includes a phone storing portion 11 and a phone communication portion 19 as essential configurations. Accordingly, each of the driver smartphone 10-1, the passenger 1 smartphone 10-2, and the passenger 2 smartphone 10-3, which are the portable communication devices 10, are essential configurations like the phone storing portion 11 and the phone communication portion 19.

As an exemplary embodiment of the present invention, the phone storing portion 11 includes a phone number repository, or phone book, 12, a call record repository 13, a message record repository 14, and a scheduler 15; and receives an external signal and transmits stored information to the phone communication portion 19. The phone number repository 12 stores a phone number; and the driver smartphone 10-1 stores a driver's phone number and the passengers 1,2 smartphones 10-2, 10-3 store a phone number of the passenger 1 or the passenger 2, respectively. The call record repository 13 stores a call history; and the driver smartphone 10-1 stores a driver's call record and the passengers 1,2 smartphones 10-2, 10-3 store a call history of the passenger 1 or the passenger 2, respectively. The message record repository 14 stores a message transmission/receipt record including SNS, SMS and the like; and the driver smartphone 10-1 stores a driver's message transmission/receipt record and the passengers 1,2 smartphones 10-2, 10-3 store a message transmission/receipt record of the passenger 1 or the passenger 2, respectively. The scheduler 15 stores a prepared schedule and the passengers 1,2 smartphones 10-2, 10-3 store a schedule of the passenger 1 or the passenger 2, respectively. The call record repository 13 stores a call record in the last call sequence and the call record repository 13 or the message record repository 14 stores information on a location search (GPS location or navigation map search).

As an exemplary embodiment of the present invention, the phone communication portion 19 necessarily includes a configuration for data transmission or data mirroring and transmits the stored contents of the phone storing portion 11 to the vehicle terminal device 20.

Referring to FIG. 3, the vehicle terminal device 20 includes a vehicle terminal portion 20-1 including a terminal storing portion 21 and a terminal communication portion 29 as essential configurations; and performs a mobile phone pairing using each of the driver smartphone 10-1, the passenger 1 smartphone 10-2, the passenger 2 smartphone 10-3, and a Bluetooth.

As an exemplary embodiment of the present invention, the terminal storing portion 21 includes a phone number repository, or phone book, 22, a call record repository 23, a message record repository 24, and a scheduler 25; and receives information related to the portable communication device 10 in the terminal communication portion 29 and transmits it's self-stored information to the terminal communication portion 29. The phone number repository 22 regards, as a basic storing element, the driver's phone number with respect to each of the phone numbers transmitted from each of the driver smartphone 10-1, the passenger 1 smartphone 10-2, the passenger 2 smartphone 10-3, and divides and stores the phone numbers of the passengers 1/2. The call record repository 23 regards, as a basic storing element, the driver' call record with respect to each of the phone numbers transmitted from each of the driver smartphone 10-1, the passenger 1 smartphone 10-2, the passenger 2 smartphone 10-3, and divides and stores the call records of the passengers 1,2. The message record repository 24 regards, as a basic storing element, a driver's message record including SNS, SMS and the like with respect to each of the phone numbers transmitted from each of the driver smartphone 10-1, the passenger 1 smartphone 10-2, the passenger 2 smartphone 10-3, and divides and stores the message record including SNS, SMS and the like of the passengers 1,2. The scheduler 25 regards, as a basic storing element, driver' schedule with respect to each of the phone numbers transmitted from each of the driver smartphone 10-1, the passenger 1 smartphone 10-2, the passenger 2 smartphone 10-3, and divides and stores the schedules of the passengers 1,2. Each of the call record repository 23 and the message record repository 24 applies and stores a priority of the last data.

As an exemplary embodiment of the present invention, the terminal communication portion 29 necessarily includes a configuration element for data transmission; and divides transmitted contents of the portable communication device 10 into each configuration element of the terminal storing portion 21 and transmits the stored contents of the terminal storing portion 21 to the connected vehicle center 30.

Referring to FIG. 4, the connected vehicle center 30 includes a center server portion 30-1 and a center communication portion 39 as essential configurations and performs a mobile phone data collection/analysis functions through the vehicle terminal device 20 and a vehicle terminal/a carrier-associated function, respectively.

As an exemplary embodiment of the present invention, the center server portion 30-1 includes a center storing portion 31, a center analysis portion 36, a center call switching request portion 37, and a center guide portion 38. The center storing portion 31 stores all information related to the driver and the passengers 1,2 received in the portable communication device 10. The center analysis portion 36 receives a signal received in the portable communication device 10 as a calling number; compares and analyzes the calling number with the stored information related to the center storing portion 31 and then generates a signal by a call request determination or a message transmission determination. The center call switching request portion 37 generates a call switching request signal by the call request determination and transmits it to the center communication portion 39. The center guide portion 38 generates short message and voice message signals by the message transmission determination of the center analysis portion 36 and transmits the signals to the center communication portion 39.

As an exemplary embodiment of the present invention, the center communication portion 39 receives the call request signal or the short message and voice message signals and transmits them to the mobile communication network 40.

Figure 5:
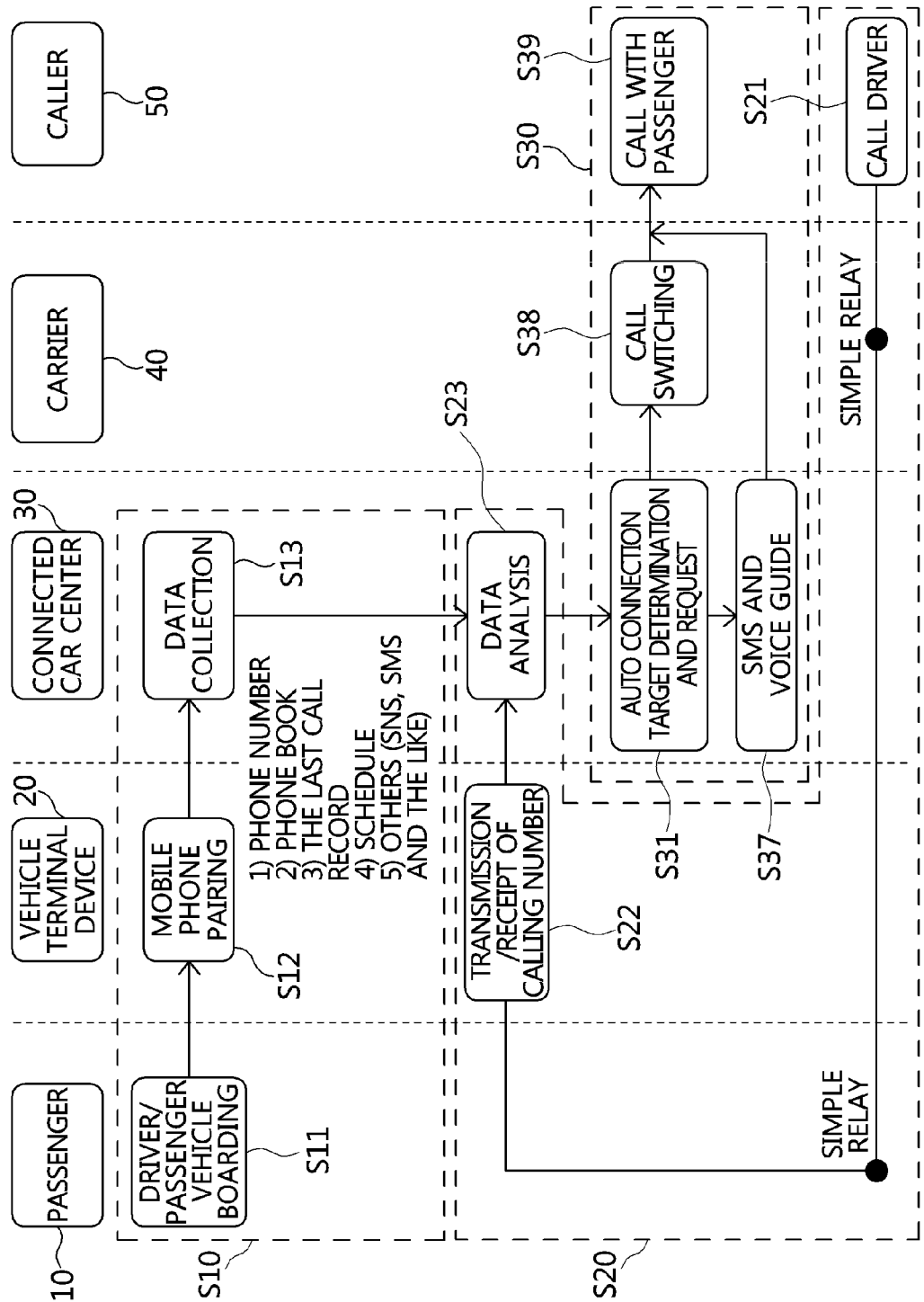
FIG. 5 is a flowchart illustrating a method for abiding by a driver's mobile phone regulations based on the driver's communication assistance infra system according to an exemplary embodiment of the present invention.

Meanwhile, referring to FIG. 5, the method for abiding by the driver's mobile phone regulations based on the driver's communication assistance infra system 1 may include recognizing the vehicle driver receiving the caller's signal which is received in the connected vehicle center 30, and controlling an intervention of a connected vehicle that connects the caller's signal to the driver's passenger via the wireless network with the vehicle.

As an exemplary embodiment of the present invention, the controlling of the intervention of the connected vehicle performs through a driver's regulations setting mode S10 making an initial setting in the connected vehicle center 30 upon taking a vehicle of a driver and a passenger; driver's event detection mode S20 detecting, as a calling signal, a signal calling the driver smartphone 10-1 from an outside; and driver's regulations-abiding mode S30 analyzing and determining the calling signal and then switching the calling signal into the passenger 1 smartphone 10-2 or the passenger 2 smartphone 10-3. From the above, although a call connection or a message receipt to the driver smartphone 10-1 is attempted, a passenger, instead of the driver while driving, performs the call connection or the message receipt using the passenger 1 smartphone 10-2 or the passenger 2 smartphone 10-3.

As a result, the driver concentrates on driving without driver's dissatisfaction due to driver's call blocking or an unidentified message, thus preemptively preventing a traffic accident by the use of the driver smartphone 10-1 while driving and reducing a social cost incurred by handling a traffic accident.

Hereinafter, the method for abiding by the driver's mobile phone regulations will be described more specifically with reference to FIG. 6 and FIG. 7. In the present case, a control body is the connected vehicle center 30 connected to the portable communication device 10 as the vehicle terminal device 20 and at the same time, associated with the mobile communication network 40; and a control target is the portable communication device 10 classified into the driver smartphone 10-1, the passenger 1 smartphone 10-2, the passenger 2 smartphone 10-3. In the present case, the driver smartphone 10-1, the passenger 1 smartphone 10-2, the passenger 2 smartphone 10-3 are named as a smartphone, but the smartphone is defined as a name generally classified.

The driver's regulations setting mode S10 includes the driver, the passenger vehicle boarding S11, the mobile phone pairing S12, and the data collection S13.

Figure 6:
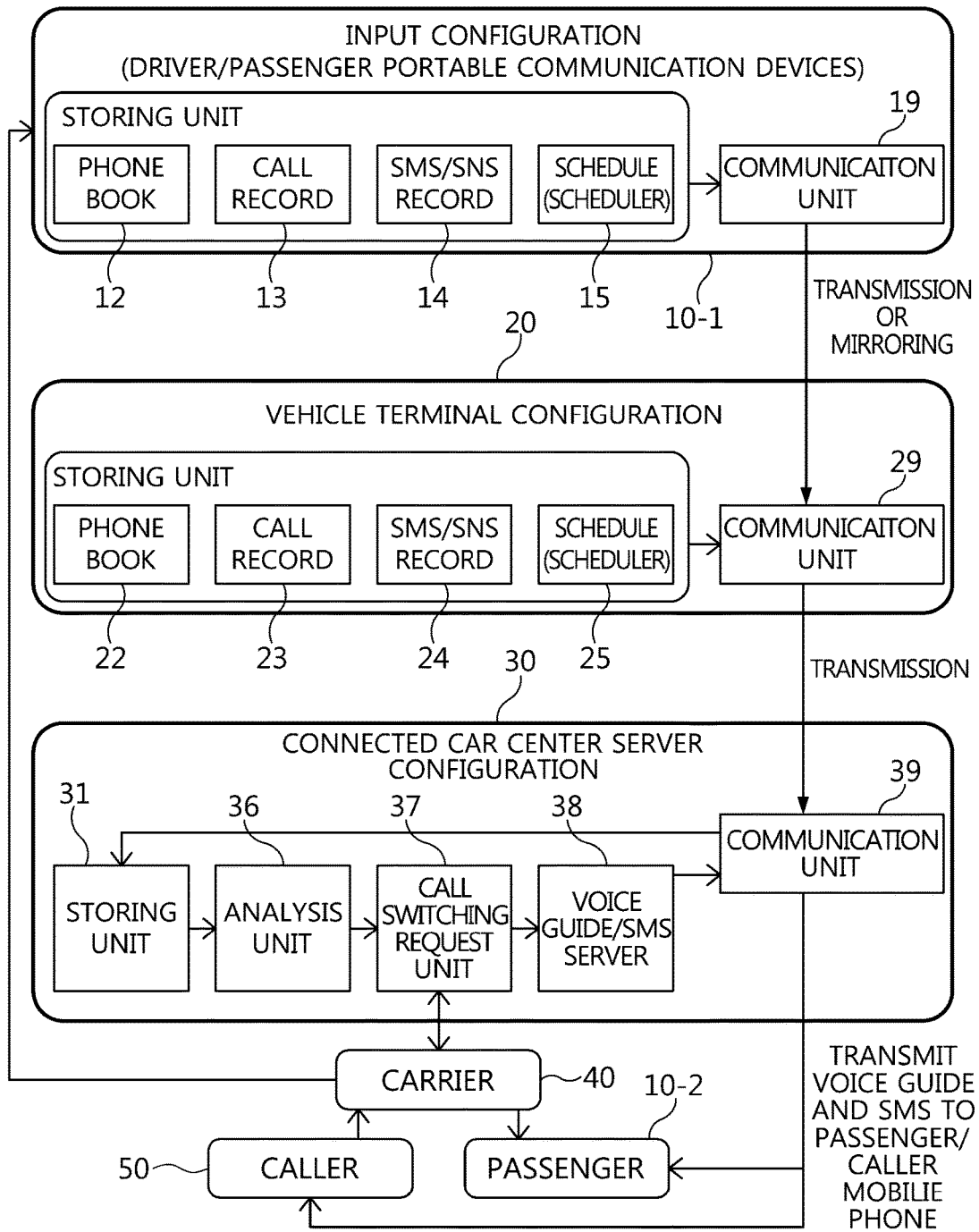
FIG. 6 is a flowchart illustrating an operation of the driver's communication assistance infra system according to an exemplary embodiment of the present invention.

Referring to FIG. 6, the driver/the passenger vehicle riding S11 activates the phone number repository 12, the call record repository 13, the message record repository 14, the scheduler 15, and the phone communication portion 19 configured in each of the driver smartphone 10-1, the passenger 1 smartphone, 10-2, and the passenger 2 smartphone 10-3. The mobile phone pairing S12 activates the phone number repository 22, the call record repository 23, the message record repository 24, the scheduler 25, and the terminal communication portion 29 of the vehicle terminal device 20; and the vehicle terminal device 20 performs the mobile phone pairing with respect to each of the driver smartphone 10-1, the passenger 1 smartphone 10-2, and the passenger 2 smartphone 10-3. As a result, the terminal communication portion 29 receives the mobile phone information transmitted or mirrored from the phone communication portion 19. The data collection S13 receives, in the center communication portion 39 of the connected vehicle center 30, the mobile phone information transmitted from the terminal communication portion 29 and stores the received mobile phone information in the center server portion 30-1 of the connected vehicle center 30.

As a result, the connected vehicle center 30 is set and switched as a ready status that may monitor, in the center server portion 30-1, an external connection attempt to the driver smartphone 10-1 taking the vehicle. At the present time, the connected vehicle center 30 excludes a monitoring on a vehicle that the mobile phone information on the driver smartphone 10-1 is not detected, thus reducing a monitoring load of the center server portion 30-1. The connected vehicle center 30 may practically perform a monitoring on all vehicles on the road through capacity expansion of the center server portion 30-1.

The driver's event detection mode S20 performs calling the driver S21; transmission/receipt of a calling number rS22; and data analysis S23.

Referring to FIG. 6, the calling the driver S21 transmits the caller smartphone 50 to a wireless network via the mobile communication network 40; the transmission/receipt of the calling number S22 receives, through the connected vehicle center 30 associated with the mobile communication network 40, a phone number of the driver smartphone 10-1 that the caller attempts to call; the data analysis S23 includes confirming the driver smartphone 10-1 that has the phone number matched with the calling number received from the center server portion 30-1; identifying a vehicle that a driver of the driver smartphone 10-1 associated with the caller smartphone 50 operates; and dividing the above results by a call request determination or a message transmission determination.

Figure 7:
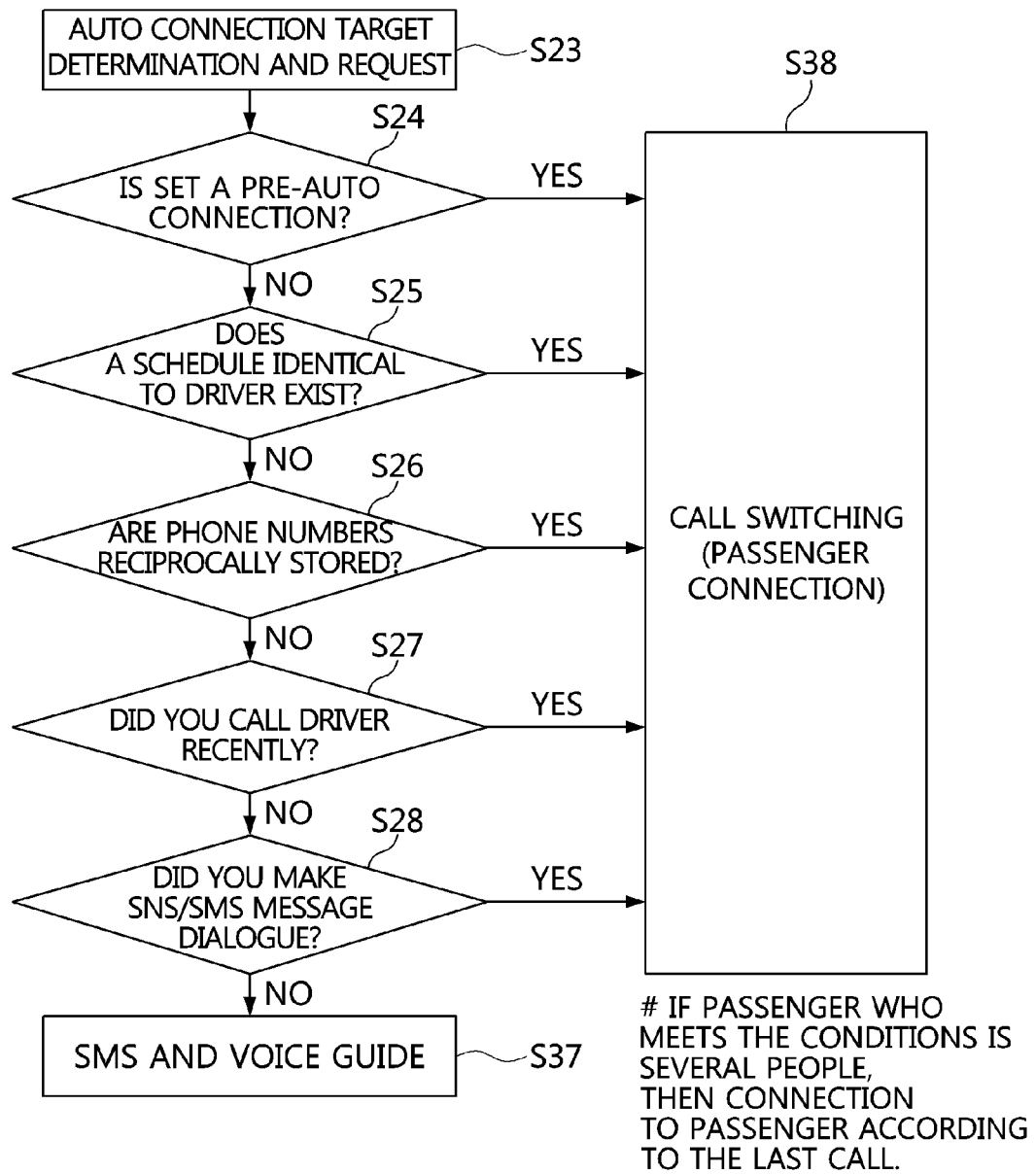
FIG. 7 is a flowchart illustrating a method for connecting a call to a passenger in the method for abiding by the driver's mobile phone regulations according to an exemplary embodiment of the present invention.

Referring to FIG. 7, the data analysis S23 includes checking a pre-automatic connection configuration S24; checking existence of a schedule identical to driver's schedule S25; checking whether to reciprocally store a phone number S26; checking the driver's recent call S27; and checking whether to form a SNS/SMS message dialogue S28. As an exemplary embodiment of the present invention, the cases that the pre-automatic connection configuration is performed in the S24; that there was SNS/SMS message dialogues with the driver in the S25; that the phone numbers are reciprocally stored in the S26; that there was a recent call with the driver in the S27; and that there was a SNS/SMS message dialogue with the driver in the S28, respectively are determined by the call request, while the cases that the pre-automatic connection setting is not performed in the S24; that there was not SNS/SMS message dialogues with the driver in the S25; that the phone numbers are reciprocally not stored in the S26; that there was not a recent call with the driver in the S27; and that there was no a SNS/SMS message dialogue with the driver, respectively are determined by the message transmission.

The driver's regulations-abiding mode S30 includes selecting and requesting auto connection target S31, guiding SMS and voice S37, switching a call S38, and calling with a passenger S39.

Referring to FIG. 6, the selecting and requesting the auto connection target S31 generates a call request signal of the center communication portion 39 according to the call request determination of the center server portion 30-1 which is a result of data analysis S23; the switching of the call S38 requests the call request signal via the mobile communication network 40; the calling with the passenger S39 connects the call to the passenger 1 smartphone 10-2 or the passenger 2 smartphone 10-3 identical to a call switching request relayed in the mobile communication network 40. The call switching request transmits the typical voice guide of "A driver is driving so I will connect the call to your passenger" to the caller smartphone 50 at the same time. As a result, the driver while driving may confirm the caller's call contents through the passenger connected to the caller without a direct call connection.

On the other hand, the guiding of the SMS and voice S37 requests a message request signal of the center communication portion 39 according to the message request determination of the center server portion 30-1, which is the result of data analysis S23 via the mobile communication network 40; the calling with the passenger S39 transmits a message to the passenger 1 smartphone 10-2 or the passenger 2 smartphone 10-3 identical to the message request relayed in the mobile communication network 40. As a result, the driver while driving may confirm the caller's message through the passenger who receives the caller's message without a message confirmation. The message request transmits a voice guide and a typical SMS of "A driver is driving so I will connect the call to your passenger" to the caller smartphone 50 at the same time. As a result, the driver while driving may confirm the caller's call contents through the passenger who receives the caller's message without a direct message confirmation.

As described above, the driver's communication assistance infra system according to an exemplary embodiment of the present invention includes the vehicle terminal device 20 mounted in the vehicle and obtaining the mobile phone information related to the portable communication devices 10 of the driver and the passenger in the vehicle using the mobile phone pairing; and the connected vehicle center 30 receiving and storing the mobile phone information transmitted from the vehicle terminal device 20 and connecting the calling number to the passenger via the mobile communication network 40 upon receipt of the calling number transmitted by the caller while the driver is driving, and the use of the portable communication device 10 of the driver in a driving by the connected vehicle center 30 is switched to the passenger, thus abiding by the driver's mobile phone regulations. As a result, it is possible to preemptively prevent a traffic an accident caused by the use of the mobile phone (smartphone) while driving that results in the reduction of the social cost by blocking the use of the mobile phone (smartphone) of the driver and to prevent driver's dissatisfaction due to an unidentified message or call through the passenger's confirmation of the call or the message.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents

What is claimed is:

1. A communication assistance infra system, comprising:
 a connected vehicle center communicating with a vehicle via a wireless network and connecting a caller signal, which is transmitted to a driver while driving, to the driver's passenger;
 a vehicle terminal device mounted in the vehicle and transmitting/receiving with the connected vehicle center; and
 a portable communication device of the driver and a passenger transmitting a mobile phone information to the vehicle terminal device using a mobile phone pairing,
 wherein the vehicle terminal device performs the mobile phone pairing between the portable communication device and the vehicle terminal device, and the connected vehicle center performs a mobile phone data collection/analysis function through the vehicle terminal device,
 wherein the connected vehicle center operates a program recognizing the driver receiving the caller's signal which is received in the connected vehicle center and performing the mobile phone data collection/analysis function for abiding by the driver's regulations, and
wherein the program is configured for a message importance classification according to a big data technology based on storing/using history of a mobile phone of the driver and the driver's passenger for minimizing the driver's dissatisfaction.

2. The communication assistance infra system of claim 1, wherein the wireless network is a mobile communication network.

3. The communication assistance infra system of claim 1, wherein the portable communication device includes:
 a phone storing unit storing the mobile phone information; and
 a phone communication unit transmitting the mobile phone information.

4. The communication assistance infra system of claim 3, wherein the phone communication unit transmits or mirrors the mobile phone information.

5. The communication assistance infra system of claim 3, wherein the phone storing unit includes a phone book repository storing phone numbers of the driver and the passenger, respectively; a call record repository storing call records of the driver and the passenger, respectively; a message record repository storing message transmission/receipt records of the driver and the passenger, respectively; and a scheduler storing schedules of the driver and the passenger, respectively.

6. The communication assistance infra system of claim 5, wherein the call record repository stores a call record in a last call sequence; the message record repository stores a message record in a last message sequence; and the call record repository or the message record repository includes a location search information.

7. The communication assistance infra system of claim 1, wherein the mobile phone pairing of the vehicle terminal device is configured to perform with respect to portable communication devices of the driver and the passenger, respectively.

8. The communication assistance infra system of claim 7, wherein the vehicle terminal device includes;
 a terminal storing unit storing the mobile phone information; and
 a terminal communication unit receiving the mobile phone information, transmitting the mobile phone information to the terminal storing unit, and then transmitting mobile phone information to an outside thereof.

9. The communication assistance infra system of claim 8, wherein the terminal storing unit includes a phone book repository storing phone numbers of the driver and the passenger, respectively, among the mobile phone information; a call record repository storing call records of the driver and the passenger, respectively, among the mobile phone information; a message record repository storing message transmission/receipt records of the driver and the passenger, respectively, among the mobile phone information; and a scheduler storing schedules of the driver and the passenger, respectively, among the mobile phone information.

10. The communication assistance infra system of claim 1, wherein the connected vehicle center divides into the driver and the passenger, receives and stores the mobile phone information transmitted from the vehicle terminal device; and connects a caller number upon receipt of the caller signal.

11. The communication assistance infra system of claim 10, wherein the connected vehicle center includes: a center server unit performing collection and analysis of the mobile phone information collected through the vehicle terminal device; and a center communication unit performing transmission/receipt via the wireless network.

12. The communication assistance infra system of claim 11, wherein the center server unit includes;
 a center storing unit storing the mobile phone information;
 a center analyzing unit configured for receiving the caller's calling number, comparing and analyzing the calling number with a stored information related to the center storing unit, and then generating a signal with respect to a call request determination or a message transmission determination;
 a center call switching request unit generating a call request signal according to the call request determination; and
 a center guide unit generating a message request signal according to the message transmission determination with the call request signal.

13. A method for abiding by a driver's mobile phone regulations comprising:
 receiving each of mobile phone information related to the driver and a passenger and storing the mobile phone information in a connected vehicle center;
 recognizing the driver receiving a caller signal that is received in the connected vehicle center; and
 controlling an intervention of a connected vehicle connecting the caller signal to the driver's passenger via a wireless network with the vehicle,
 wherein a vehicle terminal device performs a mobile phone pairing between a portable communication device and the vehicle terminal device, and the connected vehicle center performs a mobile phone data collection/analysis function through the vehicle terminal device,
 wherein the connected vehicle center operates a program recognizing the driver receiving the caller's signal which is received in the connected vehicle center and performing the method for abiding by the driver's regulations, and
 wherein the program is configured for a message importance classification according to a big data technology based on storing/using history of a mobile phone of the driver and the driver's passenger for minimizing the driver's dissatisfaction.

14. The method for abiding by the driver's mobile phone regulations of claim 13, wherein the controlling of the intervention of the connected vehicle including:
 dividing the caller signal into signals of a call request determination and a message transmission request determination on the passenger by the connected vehicle center; and
 connecting, upon a call request, a calling number to a portable communication device of the passenger via a mobile communication network, and upon a message transmission request, transmitting a message to the portable communication device of the passenger via the mobile communication network.

15. The method for abiding by the driver's mobile phone regulations of clam 14,
 wherein the storing includes driver's regulations setting mode including the mobile phone information obtained and transmitted using the mobile phone pairing of the portable communication device by a vehicle terminal device of the vehicle;
 wherein the signal determination includes driver's event detection mode confirming a calling signal and a phone number of the driver, and then connecting the calling signal and the phone number to the portable communication device of the passenger upon the call request or transmitting a message to the portable communication device of the passenger upon the message transmission request; and wherein the signal transmission includes driver's regulations-abiding mode generating a call request signal and a message request signal, respectively, transmitting the call request signal and the message request signal to the mobile communication network, respectively, and performing the connection of the calling number according to the call request signal and the message transmission according to the message transmission request signal.

16. The method for abiding by the driver's mobile phone regulations of claim 15, wherein the driver's regulations setting mode including:

activating the portable communication device;

receiving the mobile phone information using the mobile phone pairing of the vehicle terminal device and the portable communication device; and receiving and storing, in the connected vehicle center, the mobile phone information transmitted from the vehicle terminal device.

17. The method for abiding by the driver's mobile phone regulations of claim 15, wherein the driver's event detection mode including:

transmitting, by a caller, the calling signal to the driver;

receiving the calling signal in the connected vehicle center; and confirming the driver's phone number corresponding to the calling signal, identifying the vehicle, and selecting the call request determination and the message transmission determination.

18. The method for abiding by the driver's mobile phone regulations of claim 17, wherein the call request determination including:

checking a pre-automatic connection setting of the caller and the driver;

checking existence of a same schedule of the driver and the caller;

checking whether to reciprocally store phone numbers between the driver and the caller;

checking whether to make a call between the driver and the caller before transmitting the calling number; and checking whether to make a message dialogue between the driver and the caller before transmitting, the calling number.

19. The method for abiding by the driver's mobile phone regulations of claim 15, wherein the driver's regulations-abiding mode transmits a voice guide and a message of "A driver is driving so I will transmit a message to your passenger" to the caller.

* * * * *